(12) United States Patent
Fablet et al.

(10) Patent No.: US 7,725,906 B2
(45) Date of Patent: *May 25, 2010

(54) METHOD AND DEVICE FOR EXECUTING A FUNCTION WITH SELECTION AND SENDING OF MULTIPLE RESULTS IN A CLIENT-SERVER ENVIRONMENT

(75) Inventors: Youenn Fablet, Rennes (FR); Herve Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 853 days.

This patent is subject to a terminal disclaimer.

(21) Appl. No.: 11/464,757

(22) Filed: Aug. 15, 2006

(65) Prior Publication Data

US 2006/0277252 A1    Dec. 7, 2006

Related U.S. Application Data

(63) Continuation of application No. 10/260,555, filed on Oct. 1, 2002, now Pat. No. 7,181,747.

(51) Int. Cl.
   *G06F 3/00* (2006.01)
   *G06F 15/161* (2006.01)
(52) U.S. Cl. .................. 719/328; 719/330; 709/203
(58) Field of Classification Search .............. 719/313, 719/328, 333; 709/203
   See application file for complete search history.

(56) References Cited

U.S. PATENT DOCUMENTS 4,017,835 A * 4/1977 Randolph ............... 379/91.01
5,640,564 A * 6/1997 Hamilton et al. ........... 719/315
5,784,562 A * 7/1998 Diener ..................... 709/217
6,816,871 B2 * 11/2004 Lee ......................... 707/104.1

(Continued)

FOREIGN PATENT DOCUMENTS

FR    2826749    1/2003

(Continued)

OTHER PUBLICATIONS

D. Lee, et al., "Comparative Analysis of Six XML Schema Languages", Department Of Computer Science University of California, Jun. 7, 2000.

(Continued)

*Primary Examiner*—Lechi Truong
(74) *Attorney, Agent, or Firm*—Fitzpatrick, Cella, Harper & Scinto

(57) ABSTRACT

The client obtains an interface of a data object from the server, selects a function to be applied to the data object from the obtained interface, determines types of different results that can be sent back from the server as a result of an execution of the function by the server, where the types of different results are determined from result type identification, encoded in the interface, selects at least one desired result type from the determined different result types, generates a message including the at least one selected desired result type for invoking the function; the server receives the message, extracts arguments of the function invoked by the message, extracts at least one desired result type from the message, executes the function, generates a function execution response containing the selected execution result desired by the client and sends the function execution response to the client.

17 Claims, 9 Drawing Sheets

U.S. PATENT DOCUMENTS

2003/0023628 A1    1/2003    Girardot et al.

FOREIGN PATENT DOCUMENTS

WO          0062178        10/2000
WO          0133433         5/2001

OTHER PUBLICATIONS

D. Konerding, <DEK@SOCRATES.UCSF.EDU>: "Re: riogin script", Newsgroup Message, Jun. 25, 1998. <URL://groups.google.com/groups?selm=slm46p3moa.jiu.dek%40socrates.ucsf.edu&output=gplain>, site visited Aug. 26, 2002.

M. Segal, "4.7 Immediate mode and Display Lists", Internet Document, Jul. 15, 1997. <URL: opengl.org/developers/documentation/white_papers/opengl/node27.html>, site visited Aug. 27, 2002.

Object Management Group: "The Common Object Request Broker: Architecture and Specification—Revision 2.4.2", Technical Specifications, Feb. 2001, pp. 22-22.86.

"FreeBSD Hypertext Man Pages: rsh", Internet Document, Apr. 29, 1985. <URL:FreeBSD.org/cgi/man.cgi?query=rsh&apropos=0&skeltion=0&manpath=2.10+BSD&format=html>, site visited Aug. 26, 2002.

"FreeBSD Hypertext Man Pages: sh", Internet Document, May 5, 1986. <URL:FreeBSD.org/cgi/man.cgi?query=sh&apropos=0&sektion=0&manpath=2.10+BSD&format=html>, site visited Aug. 26, 2002.

A. Chatterjee, "Futures: A Mechanism For Concurrency Among Objects", Proceedings Of The Supercomputing Conference, Reno, Nov. 13-17, 1989, New York, IEEE, US, vol. Conf. 2. Nov. 13, 1989, pp. 562-567.

* cited by examiner

100

```
<image
interface="http://www.crf.canon.fr/imageInterface.xsd">
        <name>Flower</name>
</image>
```

110

```
<interface
    name="imageInterface"
    href="http://www.crf.canon.fr/imageInterface.xsd"
    xmlns:xs="http://www.w3.org/2001/XMLSchema"/>

<rotate>
        <angle type='xs:float' />              1101

<width type='xs:integer' out='true' returned='true'/>
        <height type='xs:integer' out='true' returned='true'/>
        <preview type='image' out='true' returned='false' />
        <pixels type='image' out='true' returned='false'/>

</rotate>

<resize>
        <factor type='xs :float' />
    </resize>

</interface>
```

*FIG. 1*

METHOD AND DEVICE FOR EXECUTING A FUNCTION WITH SELECTION AND SENDING OF MULTIPLE RESULTS IN A CLIENT-SERVER ENVIRONMENT

This application is a continuation of application Ser. No. 10/260,555, filed on Oct. 1, 2002 now U.S. Pat. No. 7,181, 747.

The present invention generally relates to the execution of functions applied to data objects in a client-server environment More particularly, the invention relates, on the one hand, to a method of requesting the execution of a function in a client computer system in a client-server environment, the function being applicable to a data object processed by a server computer system, the method comprising the steps of obtaining an interface of the object and of selecting a function from the interface.

On the other hand, the invention relates to a first and a second methods of executing a function in a server computer system, in a client-server environment, these methods comprising receiving a message invoking the function, coming from a client computer system.

The invention also concerns computer systems capable of implementing the above-mentioned methods.

Generally in an object oriented system, a data object is an element comprising data, also known as attributes, and functions or methods which may possibly use input arguments. Typically, these functions may be called or invoked in order to manipulate the data of the object. The set of functions applicable to an object and its attributes constitutes the interface of the object.

Each data object is created in a programming language used by a software application which is implemented on the site of the network on which the object is created. Such programming languages are known, for example, under the name of JAVA or C++.

In order for a data object to be shared on a communication network, it is necessary to encode it in such a manner that it is neither dependent on the architecture of the communication network, nor dependent on the programming language in which the software application created the object. This is necessary since another computer may not have the same network architecture or may implement a different software application.

When the data object is received by another site, an inverse operation of translation must be applied to the object to obtain a representation of the object in the software application implemented on the second site.

The Internet network with its languages and its communication protocols particularly lends itself to the development of a worldwide object oriented system.

More particularly, the World Wide Web (Web or WWW) constitutes the favored interface for accessing the majority of the resources available on the Internet. The Web is a set of Internet protocols and software applications which present information in a hypertext format. The hypertext concept is used for constructing computer documents which reference other documents by means of links, which are easily selectable by inexperienced users.

The HTML language (HyperText Markup Language) is a tag language designed for describing the way in which documents must be displayed by Web browsers. This language, on account of its simplicity and ease of use, was quickly adopted as a standard in the Internet world. However, it is impossible to extend this language beyond what it was designed for, that is to say, the presentation of documents. Authors of documents are not in fact permitted to create new tags for their specific requirements.

The XML language (eXtensible Markup Language) was created in particular to remedy the weakness of the HTML language. The XML language is defined according to a standard of the international organization known by the name "W3 Consortium" (W3C). XML is a markup language with structuring tags: each tag corresponds to an element, which can be present one or more times in the document. A tag can contain text or other tags. Where it contains other tags, a tag is comparable to a node in a tree. Unlike HTML, the name of tags is not subject to a standard; it is defined by the programmer. Furthermore, each opening tag must be accompanied by a closing tag, or be an empty tag. This constraint makes it possible to create documents having a hierarchical structure which can be represented in the form of a tree.

Through its hierarchical (tree) structure, the XML language allows structured data to be represented. Moreover, an XML document is perfectly readable by an "informed" human being. Finally, as XML documents are in text format, they can easily be exchanged via the Web using existing protocols such as HTTP (Hypertext Transfer Protocol).

As a complement to the XML language, "schema" languages are to be found, so designated because they make it possible to define an XML document class, the term "instance document" often being used to define a document which is valid with respect to a certain schema. Thus a DTD (Document Type Definition) is a schema language which makes it possible to specify which elements are capable of appearing in the instance documents, which elements can be contained in other elements, and in what order they must appear. Most often, a DTD is a file on its own, external to the XML document.

Recently, another schema language appeared: XML Schema, also defined by a W3C standard. XML Schema has the advantage compared with the DTD of using the XML syntax. In other words, a document expressed in XML Schema (referred to as an XML schema) is an XML document. Thus any XML schema can be manipulated by any XML editor. The XML Schema language has, among others, the advantage over the XML language, of allowing the creation of complex types.

The document constituted by the French patent application No. 9908155 filed in the name of the company Canon describes a method and device for remote execution of a function on a data object in a communication network. More particularly, this document proposes a method of describing the interface of an object, based on the use of the XML language.

The document constituted by the French patent application No. 0108772, also filed in the name of the company Canon, describes a method and device for describing the interface of a data object. According to this document, a function applicable to a given data object (for example a digital image) is defined by a first tag using the syntax of the XML language. Furthermore, second tags, contained in the first, and using the syntax of the XML Schema language make it possible to describe the arguments of the function and the types of these arguments. In addition, if the function produces a result, a third tag is defined, also contained in the first, describing the result of the function, the type of the result being expressed using the XML Schema syntax.

Thus, in this context, to remotely perform a function invocation on a data object, a client computer transmits to a server computer hosting the object an XML file which conforms to a syntax predefined by the server.

However, in the prior art currently known, and in particular in the above-mentioned documents, when a given function applicable to a data object sends back a result, it usually sends a single result, and the user has no possibility of choice concerning this result.

Moreover, when a user requests several results, there are generally two possible solutions. Either several distinct functions are invoked, each of them sending back one of the requested results, or a single function is invoked, the function sending back a plurality of results.

In the first case, each function invocation uses up response time and bandwidth on the network. In the second case, where the function sends back all the results which it can generate, there may be among them results that are not desired by the user. The results that are not useful also use up bandwidth on the network, and moreover the user has to sort through the results sent back.

However, in particular with the development of electronic commerce on the Internet, there is a real need to be able to provide the user with services having a high degree of flexibility of use, particularly through the use of functions applied to data objects, which are able to send back multiple results which can be selected by the user.

The object of the present invention is to meet this need.

To this end, according to a first aspect the invention relates to a method of requesting the execution of a function in a client computer system in a client-server environment, the function being applicable to a data object processed by a server computer system. This method comprises the steps of:

obtaining an interface of the object;
selecting a function from this interface;
determining the different results sent back as a result of the execution of the function, from result identification information, encoded in the interface;
selecting at least one desired result from said result identification information;
generating a message invoking the function, the invoking message including a selected result;
sending the message invoking the function to said server.

By virtue of this method, a (human) user of the client computer system is given the possibility of choosing the results which he wishes to obtain from the execution of the function chosen and applied to the data object under consideration, and of obtaining only the chosen results in return from the server system.

According to a particularly advantageous feature of the invention, the step of selecting at least one desired result includes, for each desired result, determining one or more recipient computer systems ("recipients") of the corresponding result; the invoking message then including a list of desired results and identification information of the recipient or recipients for each desired result.

In this manner, apart from the possibility of choosing the results sent back by the server, the user has the possibility of specifying, for each result or for each group of results defined by him, a computer recipient (in the client-server environment) for this result or this group of results. Furthermore, a given result can be sent to several recipients without the server having to calculate this result several times.

According to a preferred embodiment, the method further comprises a step of displaying the results received.

In a complementary manner, the present invention also relates to a first method of executing a function in a server computer system ("server") in a client-server environment. This first method comprises:

receiving a message invoking the function, from a client computer system;
extracting the arguments of the function invoked by the invoking message;
extracting from the invoking message, at least one type of execution result desired in return by the client;
executing the function while applying to it the extracted arguments;
selecting, among the results obtained during the execution of the function, the results desired by the client extracted from the invoking message.
generating a function execution response message, said response message containing the execution result desired by said client;
sending the function execution response message to the client.

According to an advantageous feature of the invention, the step of extracting a list of desired results includes a step of extracting, from the invoking message, a list of desired results and information for identifying one or more recipient computer systems for each type of desired result.

Moreover, the steps of generating and sending the response message to the client includes the following steps:

generating a separate response message per recipient identified, each response message containing the corresponding result or results;
sending the response messages to the different recipients.

According to a preferred embodiment, the client-server environment is a communication network of the Internet type on which the client and server computer systems communicate remotely.

In this embodiment, the communication protocol used is the HTTP protocol. Furthermore, the interface of the data object, the function invoking message, and the function execution response messages, are computer documents of which the content is represented in a markup language of XML type.

According to a second aspect, the invention relates to a second method of executing a function in a server computer system, in a client-server environment, this function being able to send back a plurality of different results, and being applicable to a data object.

This second method comprises:

receiving a message invoking the function, coming from a client;
extracting from the invoking message, at least one type of execution result desired in return by the client;
obtaining a set of subprograms associated with the function, each subprogram being responsible for the generation of a particular result among the different results which can be sent back following the execution of the function;
selecting the subprogram making it possible to generate the desired result under consideration;
executing the subprogram for processing the function and executing the selected subprogram;
generating a function execution response, the response containing the result produced by the execution of the selected subprogram;
sending the function execution response to the client.

Thus, in executing only the subprograms associated with the function which makes it possible to obtain the results requested by the client system, an increase in the processing speed of the function in the server system is achieved, and thus a reduction in response time vis-à-vis the client. Moreover, by sending an execution response containing only the results asked for by the client system, it is avoided for the latter to have to sort through the results received in order to select only those desired. Furthermore, in the context of a communication network, the load of the network is also reduced.

According to an advantageous feature of the second aspect invention, the step of extracting a type of desired result includes a step of extracting, from the invoking message, a list of desired results and information for identifying at least one recipient computer system for each type of desired result.

Moreover, the steps of generating and sending the execution response to the client includes the following steps:
generating a different response message per recipient identified, each response message containing the corresponding result or results;
sending the response messages to the different recipients.

The invention also relates to a client computer system comprising means adapted for the implementation of a method of requesting the execution of a function as succinctly set out above.

In a similar manner, the invention also relates to a server computer system, comprising means adapted to implement a first method of executing a function as succinctly set out above.

The invention also relates to a server computer system comprising means adapted for the implementation of a second method of executing a function as succinctly set out above.

The invention also relates, on the one hand, to a computer program on a data medium, remarkable in that it comprises instructions making it possible to implement a method of requesting the execution of a function as briefly set out above, when this program is loaded and executed in a client computer system; and on the other hand, a computer program on a data medium, remarkable in that it comprises instructions making it possible to implement a first method of executing a function as briefly set out above, when this program is loaded and executed in a server computer system.

The invention also relates to a computer program on an information medium, remarkable in that it comprises instructions making it possible to implement a second method of executing a function as briefly set out above, when this program is loaded and executed in a server computer system.

The invention also relates to an information medium containing such computer programs. Such an information medium can comprise a storage means, such as a ROM, for example a CD-ROM or a semiconductor ROM, or a magnetic recording means, for example a floppy disk or a hard disk. Moreover, the medium can be a transmissible medium such as an electrical or optical signal, which can be conveyed via an electrical or optical cable, or else by radio or by other means.

The advantages of these computer systems, computer programs, and of this information medium are identical to those of the method of requesting execution and to the first and second methods of execution of a function, as briefly set out above.

Other features and advantages of the invention will also emerge in the following description of a preferred embodiment described with the aid of the accompanying drawings in which:

FIG. 1 shows an example of two documents according to the invention expressed in a markup language and describing respectively a data object and its interface;

Figure 8A:
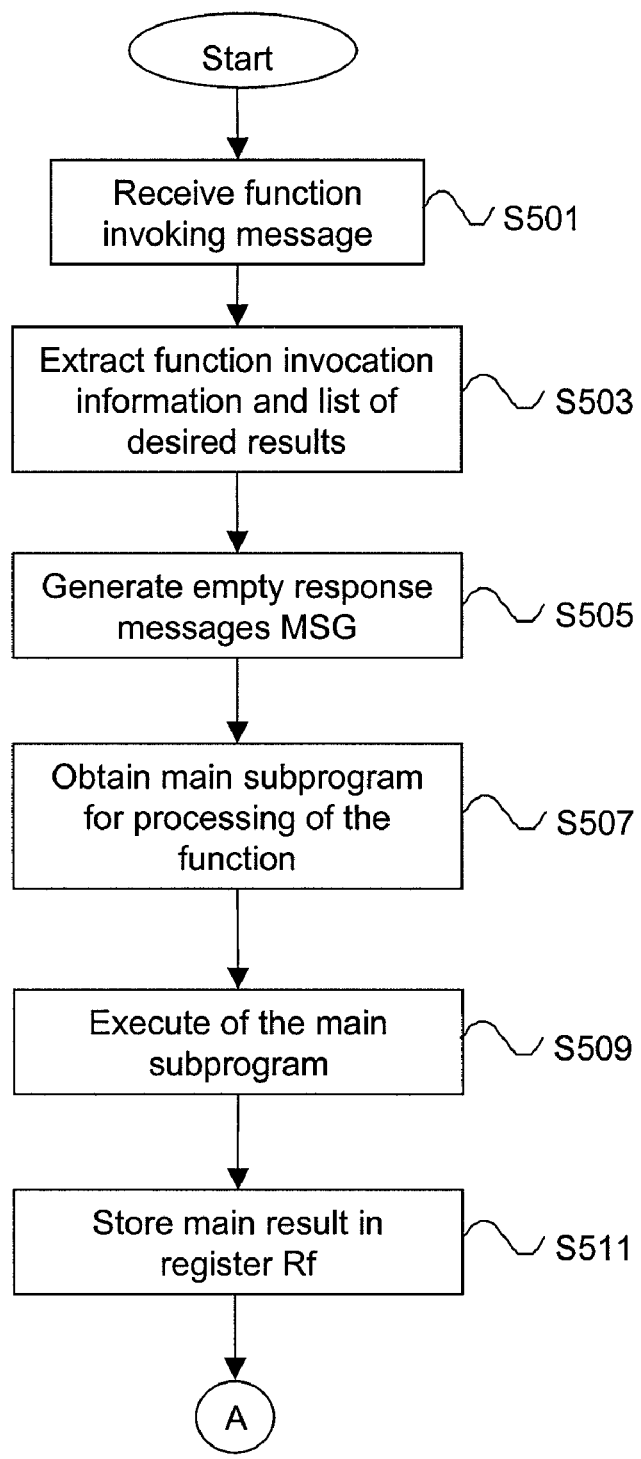
Figure 8B:
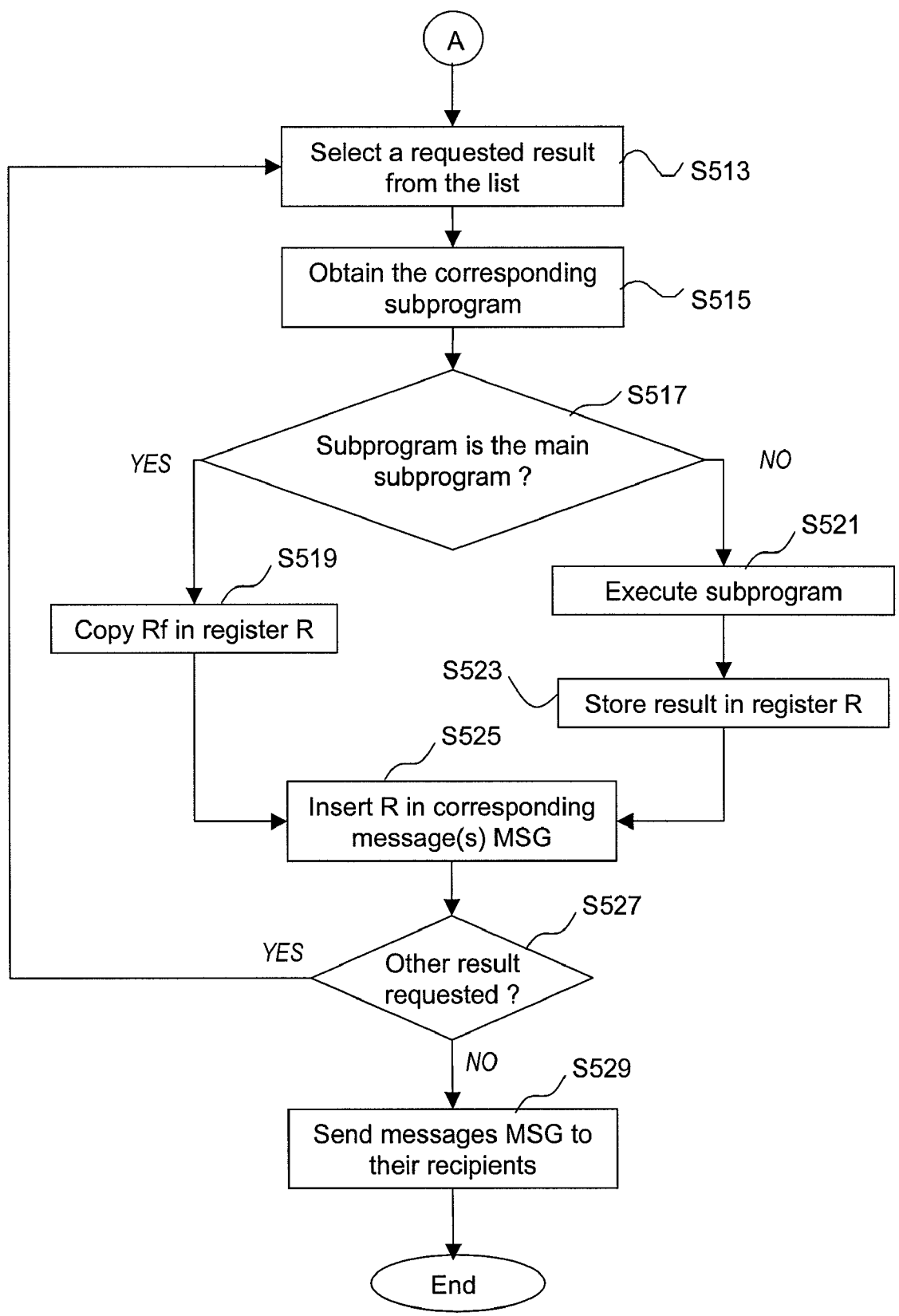

FIG. 8, made up of FIGS. 8A to 8B, is a flowchart showing a second method of executing a function in a server computer system in a client-server environment, according to a preferred embodiment of the invention.

In the embodiment described and shown in the Figures, the client-server environment is the Web on the Internet.

FIG. 1 shows an example of two computer documents according to the invention expressed in a markup language and describing respectively a data object and its interface. In the preferred embodiment, the markup language is the XML language.

Document 100 is thus an XML document describing a data object, here a digital image stored in a server computer on the network (for example an image server).

Document 100 may be obtained by a user using a "client" computer on the network, for example after having consulted a computer site (web site) and having clicked on a hypertext link or on a data object displayed on a screen.

According to document 100, an data object "image" is described between the opening and closing XML tags. "<image . . . >" and "</image>". The interface of this object may be obtained at the HTTP electronic address "http://www.crf.canon.fr/", in the file "imageInterface.xsd". In this file, the object "image" is identified by the name "Flower".

The document 100 is for example displayed on a screen associated with the client computer, via a graphical user interface (GUI). To obtain the image "Flower" from the document 100, the user may for example enter a keyboard command or click on a graphical element displayed for this purpose on the screen.

The interface of the object, that is to say the document 110, is then downloaded into the client computer from the electronic address "http://www.crf.canon.fr/".

In this example, the interface of the object describes two functions which are applicable to it:
the function "rotate";
the function "resize".

To each of these functions corresponds definitions of input arguments of the function and identification information of the type of results that may be returned further to the execution of the function.

This information is encoded with the help of tags using the syntax of the XML schema language.

Thus, in the interface 110, the function "rotate" is defined by encoded information between the opening and closing tags: <rotate> and </rotate>. The first tag <angle type="xs: float/> defines the input argument of this function: "angle" of float type.

The other tags, grouped together under the reference to 1101, each define a type of result which may be returned by the function "rotate".

Thus, four types of result are defined:
"width": width of the image;
"height": height of the image;
"preview": display of a thumbnail image;
"pixels": display of the image at its normal size.

Each of these tags (e.g. <width .../>) defining a particular type of result returned by the function further comprises two attributes: "out" and "returned".

When the attribute out is equal to 'true' it defines the corresponding element (e.g. width) as being an execution result. When the attribute returned is equal to 'true' it indicates that the corresponding result is returned by default to the client computer system, which was the sender of the function invocation. In this manner, if the user does not specify which results he wishes to obtain, he is sent back a response by default containing all the results for which the attribute returned has the value 'true'.

The second function "resize" defined in the interface (110) of the object under consideration (image) itself returns no result. This is because only its argument (factor) is defined, and it does not comprise any other element comprising an attribute out='true'.

Figure 2:
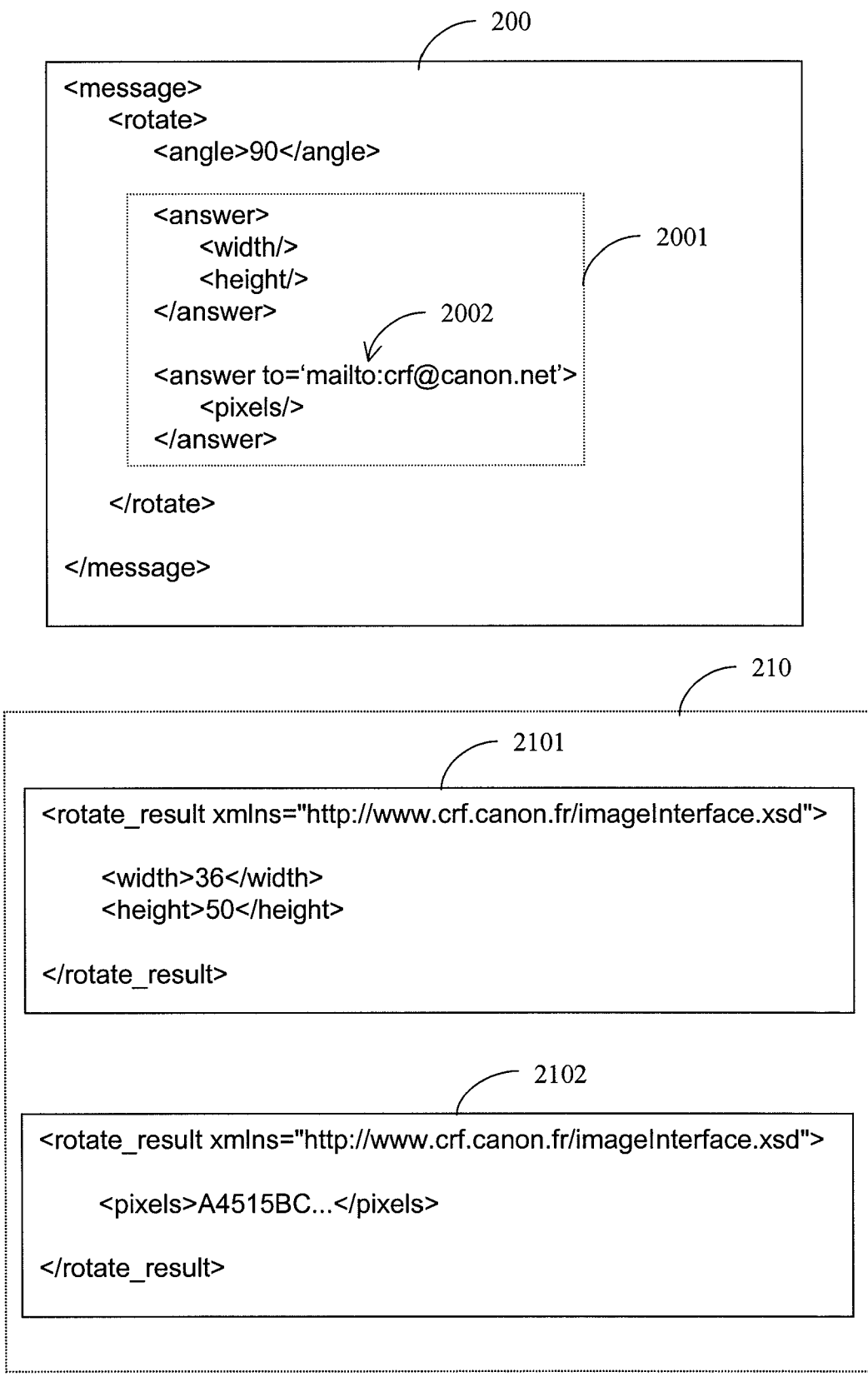
FIG. 2 shows an example of two computer documents according to the invention, expressed in the same markup language, and describing respectively a message invoking a function applicable to a data object and response messages obtained after execution of the function.

FIG. 2 shows an example of two computer documents, respectively describing a message (200) invoking the function "rotate" defined in the document 110, and a response message (210) obtained after execution of the function by the server system. These two documents (200, 210) are also XML documents.

It is assumed that the user of the client computer system has selected beforehand, from the interface 110 of the object, several types of result from the list 1101. A function invoking message 200 is then generated, in the client system.

As shown in FIG. 2, the function(s) invoking message 200 is defined between the opening and closing tags, respectively. <message> and </message>. In this example, a single function is invoked, the function rotate.

The invoking of the chosen function rotate is defined by the information encoded between the opening and closing tags: <rotate> and </rotate>.

The element <angle>90</angle> defines the value (90) of the sole input argument "angle" of the function rotate. This example thus concerns the application of a rotation of 90 degrees to the image object "Flower".

The message (200) invoking the function (rotate) includes a list of desired execution results. This list is identified in FIG. 2 by the reference to 2001.

Each of the results of the list 2001 is represented by an XML tag, itself inserted between an opening tag (<answer>) and a closing tag (</answer>). Each pair of opening and closing tags (<answer>, </answer>) defines a sub-list of desired results which are destined for a particular recipient on the network.

Thus in the example given (message 200), two sub-lists are shown. The first comprises two types of desired result: width and height. According to the implementation chosen and illustrated, as no information concerning the recipient of these results is present in the first sub-list, the corresponding execution results will be sent by the server to the client system which was the sender of the function invocation.

In the second sub-list, a single type of result is requested: pixels. An item of information for identifying the recipient of the result is here present in the form of a particular XML attribute (to='...') inserted in the corresponding opening tag (<answer>).

In the example chosen, this recipient identification information: to='mailto:crf@canon.net' (2002), means that the result of type pixels will be sent back after execution of the function (rotate) by the server, to the e-mail address "crf@canon.net" using the SMTP protocol (Simple Mail Transfer Protocol).

Next, after processing of the invocation message 200, that is to say the request for execution of the function rotate applied to the image object Flower, the server executes the function and generates two response messages (210), one of them (2101) being destined for the client system having sent the execution request, and the other (2102) being destined for the computer system corresponding to the e-mail address "crf@canon.net".

Each of the response messages contains the desired results which correspond to each recipient defined in the invocation message 200. Each response message comprises a pair of opening and closing tags (<rotate_result ...>, </rotate_result>) indicating that an execution result of a function (rotate_result) is concerned. Within each pair of opening and closing tags, each result sent back is defined by another pair of opening and closing child tags defining the type of result and its value, obtained by the execution of the function.

Thus in the response message 2101, the value of the result of type width sent back to the client system is 36. The value of the result of type height is 50.

Similarly in the response message 2102, of which the recipient is the mail server corresponding to the address "crf@canon.net", the result sent back is of type pixels and its value is the series of hexadecimal elements: 'A4515BC ...' defining an image in bitmap format.

Figure 3:
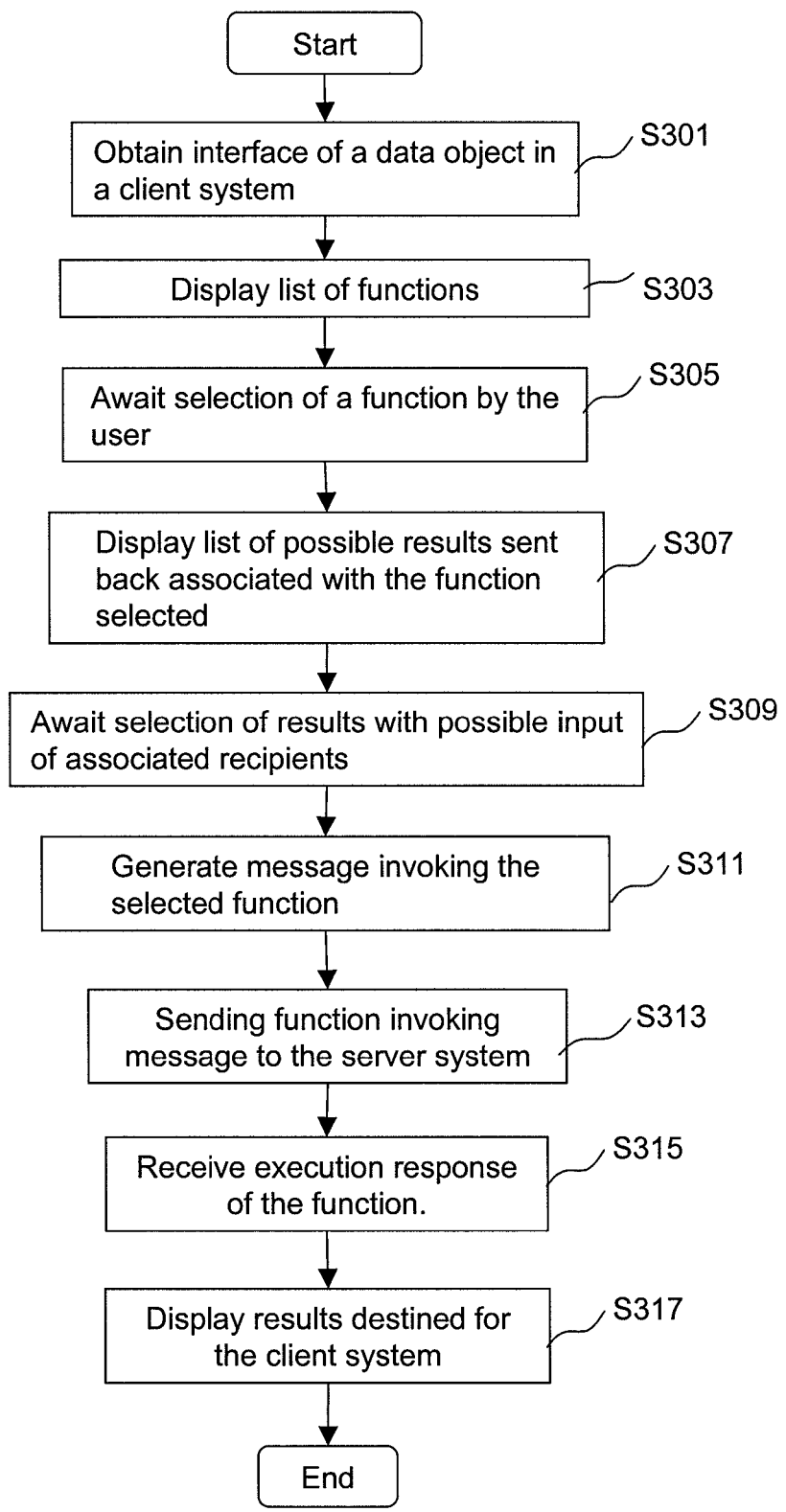
FIG. 3 is a flowchart showing a method according to the invention of requesting the execution of a function in a client computer system in a client-server environment.

With reference to FIG. 3, there will now be described a method according to the invention of requesting the execution of a function in a client computer system comprised in a client-server environment. More particularly, the process will be described which is implemented in a client computer system to obtain, based on the selection of a data object on the network, an interface of this object such as the document 110 (FIG. 1), then to generate a function invoking message such as the document 200 (FIG. 2), in order to obtain one or more response messages as shown at reference 210 (FIG. 2).

The method of requesting the execution of a function according to the invention is implemented in a client computer system (also designated by "client" or "client computer"). In a preferred embodiment the computer means enabling the implementation are essentially software or program means, loaded or stored in a resident manner in the client computer. The execution request method according to the invention is then implemented when this or these programs are executed in the client computer.

As shown in FIG. 3, the method of requesting the execution of a function according to the invention begins with a step S301 during which the user of the client system obtains the interface of a data object (for example an image) selected for example by Internet navigation on a Web site. The data object is hosted by a server computer system (also designated by "server" or "server computer").

This interface, in its raw state, is an XML document such as the one (110) shown in FIG. 1. This document interface can be used as is and be displayed on a computer screen, or else be processed first of all by a graphical interface software application so as to be easier to use by a user who is a novice in computing.

At the following step S303, a list of the functions applicable to the object is displayed on the screen in any particular form. For example, using the interface 110, the following key words could be displayed: "Rotate the image", and "Resize the image", on which the user could click to select a function.

At step S305, selection by the user of a function which he wishes to have executed on the data object under consideration is awaited. In reality, the user may select several functions if appropriate, but since the procedure is the same for each function selected, only a single function is considered here, in order to simplify the explanation.

When a function has been selected by the user, the different types of result which may be sent back after the execution of the function are determined (S307).

These types of result sent back are determined from result type identification information (1101), encoded in the interface (110). Next, by way of example, a dialog box could be displayed on the screen. In this box the different types of result (1101) will be presented to the user. The choice of the user is awaited (step S309).

According to the invention, step S309 of selecting one or more types of desired result includes, for each of the selected types of result, determining the computer system or systems of the recipient or recipients of the corresponding result, the invocation message (200) then including identification information (2002) of the recipient or recipients, e.g. such as those set out above in relation to FIG. 2.

When the user has selected one or more types of result, e.g. by clicking on the screen on the keywords representing these types of result, a function invocation message chosen previously is generated (S311). In the preferred embodiment of the invention, it is an XML message as described above (200) with reference to FIG. 2.

As described above, the invoking message (200) includes a list (2001) of desired results, each item of the list indicating a selected type of result. The function invoking message (200), also designated "function execution request", is then sent (S313) to the server computer via the network.

The server processes the function invoking message (c.f. the description with reference to FIGS. 4 and 5 below) then sends a function execution response message to the default recipients specified in the invoking message (200).

The client system receives the execution response addressed to it, at step S315. This response contains the execution results corresponding to the result types, among those selected by the user (S309), of which the recipient corresponds to the client system.

Finally (S317), the execution results are displayed on the screen of the client system.

Figure 4:
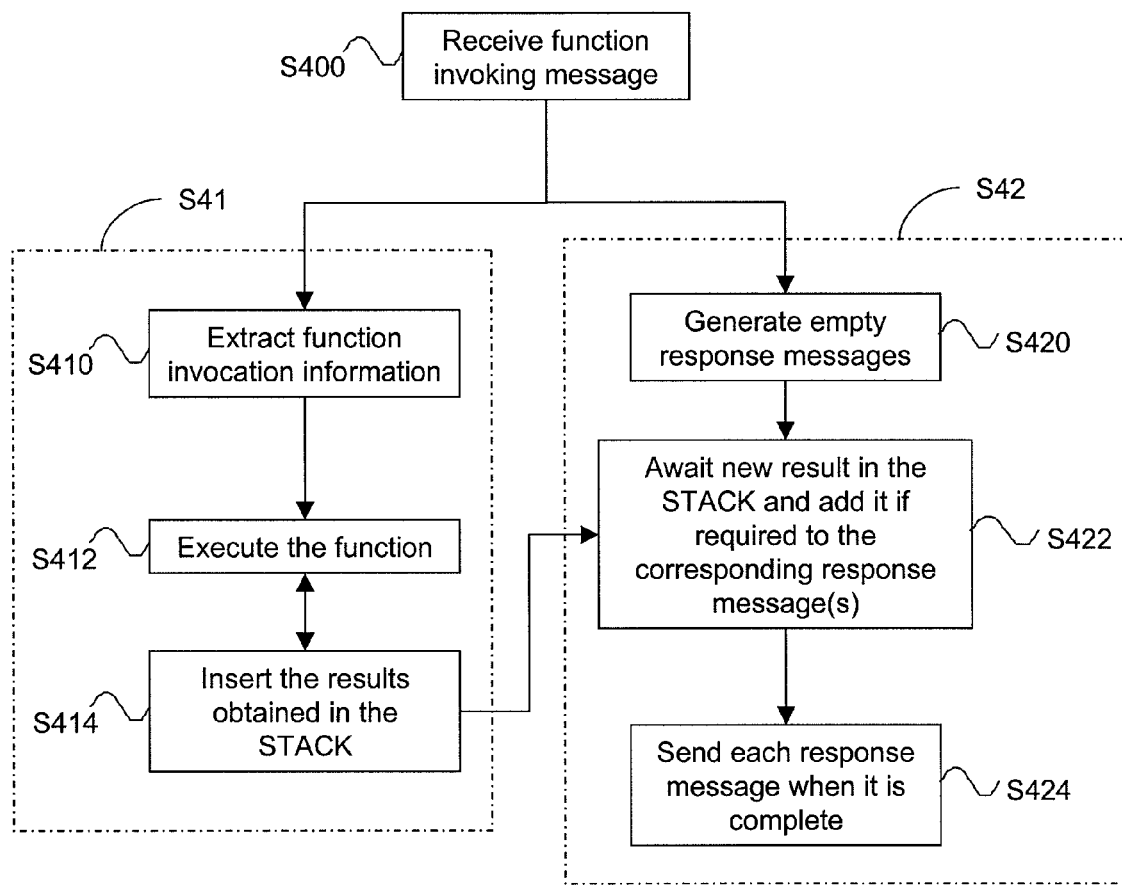
FIG. 4 is a flowchart showing a first method of executing a function in a server computer system in a client-server environment, according to a preferred embodiment of the invention.

With reference to FIG. 4, a first method of executing a function in a server computer system in a client-server environment will now be described, according to a preferred embodiment of the invention. More particularly, the process will be described as implemented in a server computer system for processing a function invoking message such as the document 200 (FIG. 2), in order to obtain one or more response messages as illustrated at reference 210 (FIG. 2).

The first method of executing a function according to the invention is implemented in a server computer system (also designated by "server" or "server computer"). In a preferred embodiment the computer means enabling the implementation of this method are essentially software or program means, loaded or stored in a resident manner on the server computer. The first executing method according to the invention is then implemented when this or these programs are executed in the server computer.

As shown in FIG. 4, the first method of executing a function according to the invention begins with a step S400 during which the server receives a function invoking message (200).

Next, according to the preferred embodiment of the invention, two processes (S41, S42) are executed in parallel. These two processes ensure respectively:

the processing of the function invocation (S41);
the processing of the responses (S42).

The processes S41 and S42 interact by means of a stack. This stack can for example be constituted by an XML file or a particular place in memory.

In the process S41, commencement (S410) is made by extracting the function invocation information of the message (200) received.

More particularly, on the one hand, identification of the function invoked and extracting the arguments from it must be carried out. In the example chosen (message 200), the argument of the function rotate is the angle of rotation of the image of which the value chosen by the user is '90' (degrees).

On the other hand, it is a matter of extracting the list of results selected by the user, which is associated with the information (2002) identifying the computer system or systems of the recipient or recipients for each type of result desired.

In the example of the message 200 the selected results are the items of information grouped together under the reference 2001, the information identifying the recipient being indicated by the reference 2002.

At step S412, the function (rotate) is executed while applying to it the extracted arguments (angle). During the execution of the function, progressively with the obtainment of the results, these are inserted (S414) in the stack (temporary memory).

As for the process S42 of processing the response messages, this begins with the step S420 during which empty response messages are generated. As will be explained below with reference to FIGS. 5 and 6, these empty messages are constituted by XML "skeletons" containing the pair of XML opening and closing tags of highest level, as well as, for each result desired, a pair of opening and closing tags not yet containing the value of the result under consideration. Furthermore, as many separate empty response messages are generated as there are different recipients identified in the function invoking message.

At the following step, S422, the apparition of a new execution result in the stack is awaited, and it is added in the corresponding response message or messages (that is to say destined for the recipient(s) specified in the function invoking message) if this result is desired by the user. In other terms, among the execution results obtained during the execution of the function, those corresponding to the list (2001) of desired results extracted from the invoking message (200) are selected.

The response messages are thus completed progressively with the apparition of the results in the stack. This provides in particular a time saving in the overall operation of processing the execution request (invoking message) of the function by the server system.

Thus a different response message is generated per recipient identified in the invoking message (2001), each response message containing the corresponding result or results.

Finally, at step S424, the function execution response messages (2101, 2102) are sent to their respective recipient.

Figure 5:
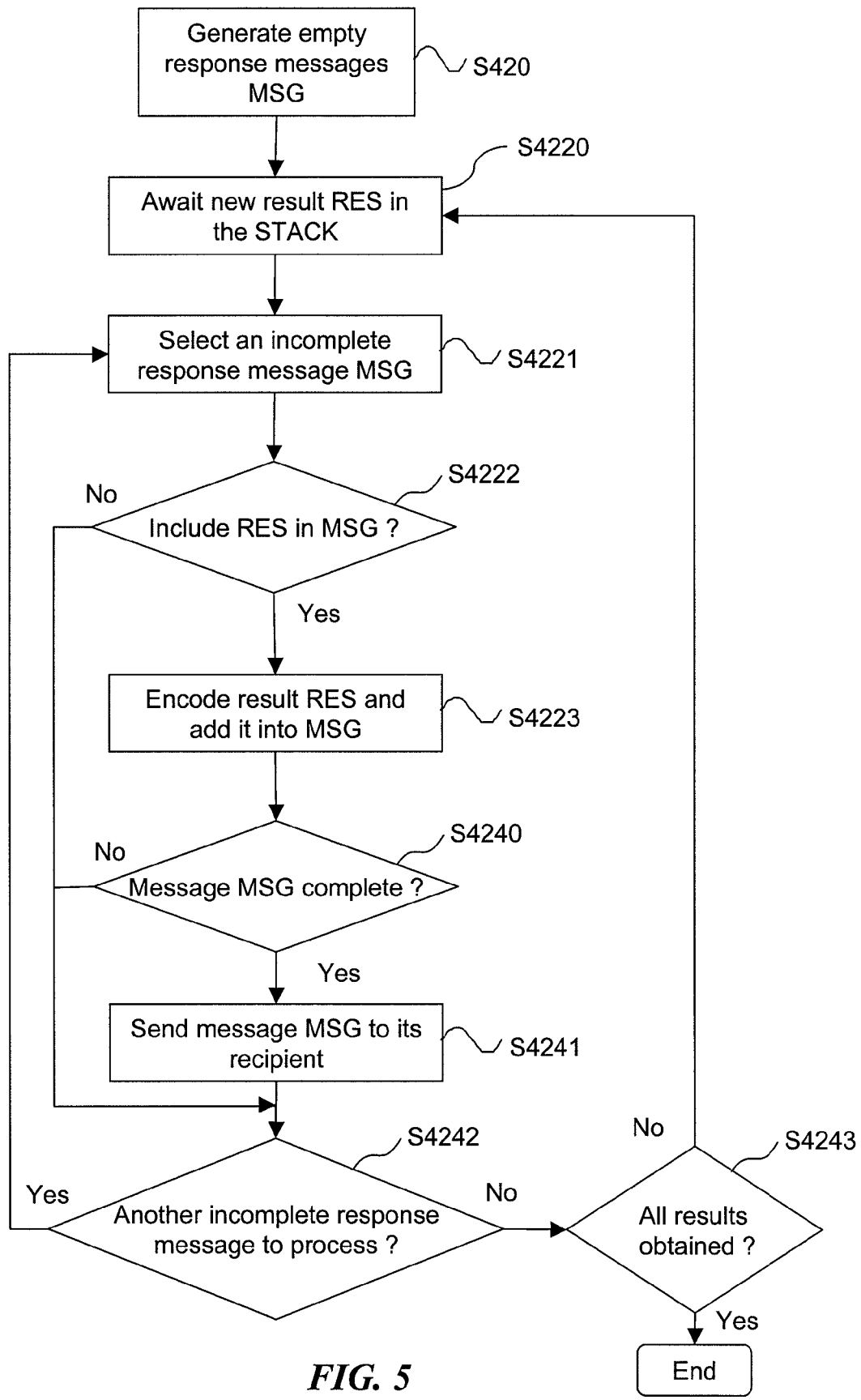
FIG. 5 is a flowchart detailing certain steps of the processing of the response messages which makes up the first method of executing a function, shown in FIG. 4.

FIG. 5 is a flowchart detailing certain operations carried out during the operation (S42, FIG. 4) of processing the responses, during which the different response messages are created and completed progressively with the apparition of the results in the stack.

FIG. 5 starts with step S420 (that of FIG. 4) during which empty response messages are generated. There are as many empty response messages as there are different recipients specified in the message invoking the function.

Step S4220 is next proceeded to, in which the insertion of an execution result (RES) in the stack is awaited. When a result has been obtained, an incomplete response message MSG is selected (S4221). (At that moment it is an empty message).

At the following step S4222 it is determined whether the result (RES) under consideration must be included or not in the incomplete message selected. This determination is carried out for example by the analysis of the result tags present in the incomplete message under consideration.

If it is the case (S4222, Yes), then during the step S4223 the result RES is encoded and added into the current incomplete message (MSG). In the opposite case (S4222, No), the step S4242 described below is gone onto directly.

At step S4240, it is determined whether the current message MSG is complete i.e. whether it contains all the results specified in the function invoking message (200). If this is the case, (S4240, Yes), in S4241 the complete response message is sent to its recipient on the network, then the test S4242 is gone on to.

If the message is not complete (S4240, No), the test S4242 is gone onto directly, during which it is determined whether there remains another incomplete response message to be processed.

If this is the case (S4242, Yes), the step S4221 is returned to in order to select another incomplete response message, and the process continues as described above.

In the opposite case (S4242, No), no other incomplete response message remains to be processed. In this case, the test S4243 is gone on to, in accordance with it is determined whether all the results required in the function invoking message have been obtained. If this is the case (S4243, Yes), the process is terminated.

In the opposite case (S4243, No), the step S4220 is retained to in order to wait for the arrival in the stack of a new function execution result, and the process continues as set out above.

Figure 6:
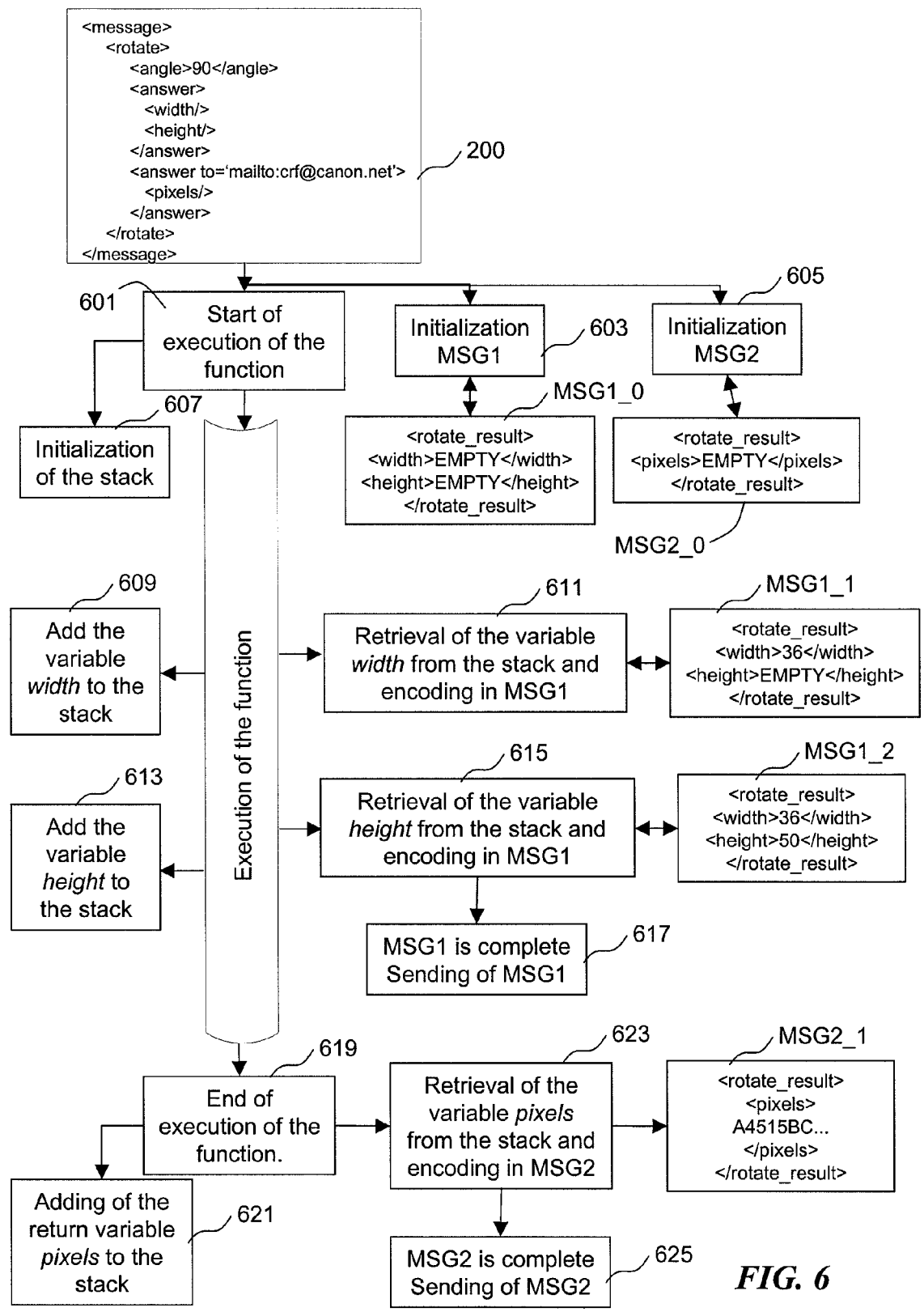
FIG. 6 shows the interaction between the process of executing the function and the process of generating the response messages, according to the embodiment of the invention shown in FIGS. 4 and 5, applied to the function invocation shown in FIG. 2.

FIG. 6 shows the interaction between the process (S41) of executing the function and the process (S42) of generating the response messages, according to the embodiment of the invention shown above with reference to FIGS. 4 and 5, and applied by way of example to the function invocating message (200) shown in FIG. 2.

As shown in FIG. 6, the function invocation 200 received in the server gives rise, after having been analyzed, to the triggering (601) of the execution of the function rotate and to the initialization (607) of the stack.

In parallel, two empty response messages are created (references 603, 607): MSG1_0 and MSG2_0. There are two of these messages, since there are two recipients specified in the message 200. These messages MSG1_0 and MSG2_0 correspond to the initialization of the messages MSG1 and MSG2 which will finally be sent to their recipient, once completed.

The message MSG1_0 contains the tags corresponding to the results "width" and "height" of the function rotate destined for the client system. The message MSG2_0 contains the tags corresponding to the results "pixels" of the function rotate, destined for the mail server with the address "crf@canon.net". The value of these results is not yet known (EMPTY).

At 609, the first result obtained on execution of the function rotate is "width", this result is contained in a variable of the same name and is stored in the stack.

At 611, the result "width" is then extracted from the stack, then encoded in the message MSG1 to produce the incomplete response message MSG1_1.

Similarly, when the result "height" is produced and inserted in the stack (at 613), it is recuperated then encoded also in MSG1 that is to say in MSG1_1, the message MSG1_2 is then produced. The value of each of the results width and height is contained in MSG1_2 (respectively '36' and '50').

The message MSG1, in the state MSG1_2, is complete; it may therefore be sent (at 617) to its recipient, here the client computer system which was the sender of the XML function execution request (200).

It should be noted that if another result is produced during the execution of the function, which is not requested in the function invoking message, for example the result "preview" for the function rotate (see interface 110), this result will be stored in the stack, but it will not be incorporated thereafter in a response message (FIG. 5, test S4222, No).

In the example shown in FIG. 6, the result "pixels" is produced at the end of the execution (619) of the function rotate. This is, in this example, the return variable of the function rotate. The return variable Pixels is then inserted in the stack (at 621).

At 623, the variable Pixels is extracted from the stack and its value encoded in the message MSG2 previously in the state MSG2_0. The value of the result "pixels": the hexadecimal series 'A4515BC . . . ' (bitmap format) is written in the response message MSG2_0. The message MSG2 now in the state MSG2_1 is complete, and can thus be sent in 625 to its recipient.

Thus, at the end of the execution process of the function rotate (performed on reception of the function invoking message 200 in the server), the server produces an execution response (210, FIG. 2) consisting of two distinct response messages MSG1 and MSG2 of respective content 2101 and 2102.

It should be noted that if, in the function invoking message, the user does not specify any result which must be returned to him directly (in the client system which he uses), it is nevertheless possible to provide for the server to send a response message to the client system, this response message containing for example a text message indicating that the execution of the function has been carried out correctly.

Figure 7:
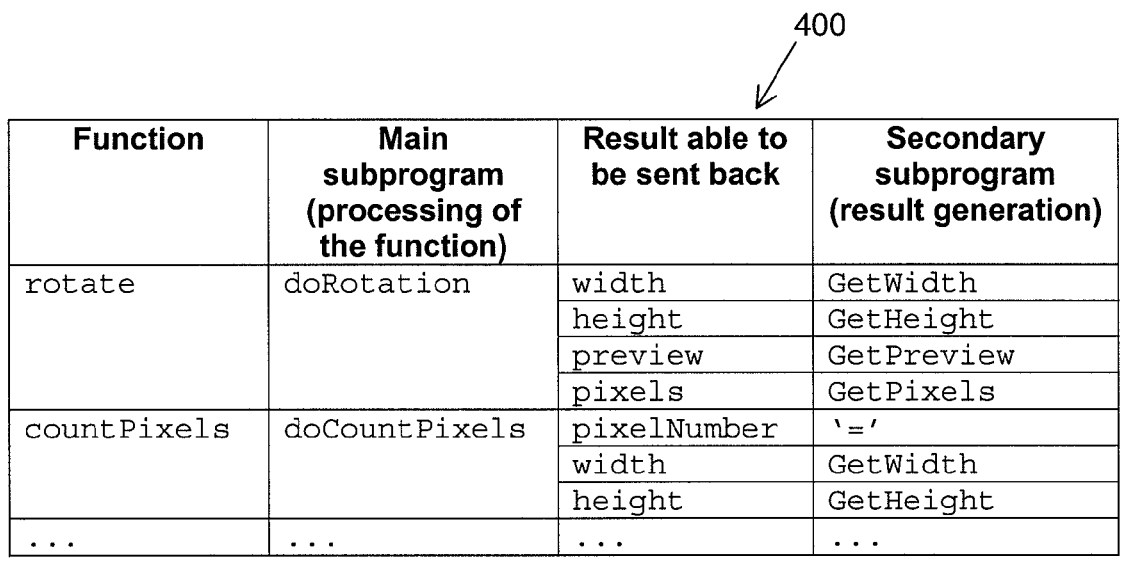
FIG. 7 shows the structure of a table stored in the memory of a server computer system, in which is stored the information relating to the functions applicable to a data object.

FIG. 7 shows the structure of a table stored in the memory of a server computer system, in which is stored the information relating to the functions applicable to a data object under consideration.

Thus, in the table 400 given by way of example in FIG. 7, in the column "Function" the names of the functions applicable to a given digital image are written. Here, only two functions, rotate and countPixels, are given.

In the second column, "Main subprogram", the name is written of the subprogram to invoke in order to process the corresponding function. Thus, for the function rotate the subprogram to invoke is "doRotation", while for the function "countPixels", the subprogram to invoke is "doCountPixels".

In the third column, "Result able to be sent back" are written the different types of results that can be sent back by a function under consideration. Thus, for the function rotate, four types of result can be sent back: width (width of the image), height (height of the image), preview (preview, that is to say display of a thumbnail) and pixels (pixels of the image, that is to say the obtaining of the image in its normal format). Similarly, for the function countPixels, three types of different result can be sent back: pixelNumber (number of pixels), width and height.

In the fourth column "Secondary subprogram" the names are written of the subprograms each responsible for the generation of the type of corresponding result in the table 400 (i.e. written on the same line) in the column "Result able to be sent back".

Thus, for the function rotate, the main subprogram doRotation enables the rotation of the image under consideration to be performed, and according to the types of results requested, all or some of the subprograms will be invoked:

GetWidth to obtain the width of the image;
GetHeight to obtain the Height of the image;
GetPreview to obtain the thumbnail for previewing;
GetPixels to obtain all the pixels of the image, i.e. to obtain the image in its original size (bitmap format).

Similarly, for the function countPixels, the main subprogram doCountPixels makes it possible to calculate the number of pixels in the image, and the secondary subprograms GetWidth and GetHeight, respectively, the width and height of the image.

It should be noted here that, the function countPixels necessarily sending back the result pixelNumber of which the value is the number of pixels in the image, the presence of the string: "'='" in the column "Secondary subprogram" means that the result pixelNumber is directly produced by the main subprogram (doCountPixels) and not by a secondary subprogram.

Thus, each subprogram associated with the function is identified in a predefined field of the table (400). The table 400, stored in the server, is used by the latter to execute a function on a data object, according to a second method of function execution in accordance with the invention.

It is to be noted here that the subprograms (main and secondary) may be written in a different programming language to that of the other subprograms, and different to that of the program, running on the server, which ensures the processing of the request for execution of the function (that is to say the processing of the function invoking message), sent by the client system.

This "modular" approach of the function execution program according to the invention makes it possible in particular to re-use existing software modules, and not to be dependent on a particular software platform, according to the client-server architecture (for example the communication network), or else according to the server computer system.

With reference to FIG. 8, made up of FIGS. 8A to 8B, there will now be described a second method of executing a function in a server computer system in a client-server environment, according to a preferred embodiment of the invention. More particularly, the process will be described as implemented in a server computer system for processing a function invoking message such as the document 200 (FIG. 2), in order to obtain one or more response messages as illustrated at reference 210 (FIG. 2).

The second method of executing a function according to the invention is implemented in a server computer system (also designated by "server" or "server computer"). In a preferred embodiment the computer means enabling the implementation of this method are essentially computer software or program means, loaded or stored in a resident manner on the server computer. The second method of execution according to the invention is then implemented when this or these programs are executed in the server computer.

As shown in FIG. 8A, the second method of executing a function begins with a step S501 during which the server receives a function invoking message (200). Next, at step S503, the function invoking information is extracted from the message (200) received.

More particularly, this involves extracting the function arguments invoked. In the example chosen (message 200), the argument of the function rotate is the angle of rotation of the image of which the value chosen by the user is '90' (degrees).

Moreover, it involves extracting the list of results selected by the user, which is associated with the information (2002) identifying the recipient computer system or systems for each type of result desired.

In the example of the message 200, the selected results are the items of information grouped together under the reference 2001, the information identifying the recipient being indicated by the reference 2002. The list of results desired by the client is thus made up, in this example, of the following types of result: width, height, pixels.

At step S505, empty response messages (MSG) are generated. These empty messages are constituted by XML "skeletons" containing the pair of XML opening and closing tags of highest level, as well as, for each result desired, a pair of opening and closing tags not yet containing the value of the result under consideration.

As many separate empty response messages are generated as there are different recipients identified in the function invoking message.

Thus, in the example of message 200, the following two empty messages will be created:

| MSG1: | MSG2: |
|---|---|
| <rotate_result><br><width>EMPTY</width><br><height>EMPTY</height><br></rotate_result> | <rotate_result><br><pixels>EMPTY</pixels><br></rotate_result> |

At the following step S507, all the subprograms associated with the function rotate identified in the function invoking message (200) are searched for in memory. In practice, the table 400 associated with the data object to which the function must be applied, will be read from memory.

After having identified the name of the function (rotate) in the table 400, the main subprogram for processing the function is identified, i.e., in the present example, the subprogram doRotation (see FIG. 7).

At step S509, this "main" subprogram for processing the function is then executed, and the corresponding execution result is saved in a memory register Rf (step S511).

Here, the subprogram executed is doRotation, and the result obtained is the image resulting from the rotation through 90 degrees of the original image.

The execution process continues in FIG. 8B, with step S513. During the course of this step, a result requested by the user is selected from the list (2001) of results, extracted from the function invoking message (200).

Next, at step S515, the (secondary) subprogram responsible for the generation of the result selected at the preceding step is searched for in the table 400.

Thus, in the example chosen and illustrated in which the list 2001 comprises the three results: width, height, and pixels, the three corresponding so-called "secondary" subprograms, identified in the table 400, will be respectively: GetWidth, GetHeight, GetPixels.

At the test step S517, it is determined if the secondary subprogram obtained at the preceding step (S515) is the main subprogram of the function.

In practice, it is determined if the corresponding field of the column "Secondary subprogram", in the table 400, contains the string of characters "'='" or not. This is the case, for example, for the result pixelNumber.

If it is the case (S517, YES), the contents of the register Rf is copied into a second register R. In fact, the register Rf already contains the execution result of the main subprogram of the function, executed at step S509.

In the opposite case (S517, NO), then at step S521, the secondary subprogram obtained (S515) is executed. Next the result obtained is stored in the register R (Step S523).

At step S525, the contents of the register R is inserted into the corresponding response message or messages (MSG1 or MSG2).

Thus, at step S525, if the desired result of which the value has just been obtained is width, the value of this result (36 pixels) is inserted in the response message MSG1, which is then in the following state:

---
MSG1 :
---
<rotate_result>
<width>36</width>
<height>EMPTY</height>
</rotate_result>
---

At the following step S527, it is determined, from the list of results (2001), whether another requested result remains to be obtained. If this is the case (S527, YES) step S513 is returned to, and the process begins again as set out above.

In the opposite case, if all the results requested have been obtained (S527, NO) the different response messages are sent (step S529) to their respective recipient, identified (FIG. 2, 2002) in the function invoking message (200). The process of executing the function in the server is then terminated.

Thus, in the example chosen and illustrated, at the end of the execution process of the function rotate (performed on reception of the function invoking message 200 in the server), the server produces an execution response (210, FIG. 2) consisting of two distinct response messages MSG1 and MSG2 of respective content 2101 and 2102.

The message MSG1 is sent to the client computer system, sender of the XML request (200) for execution of the function rotate. As for the message MSG2, this is sent to the mail server having the address "crf@canon.net" (according to the item of information 2002 specified in the message 200).

It should be noted that if, in the function invoking message, the user does not specify any result which must be returned to him directly (in the client system which he uses), it is nevertheless possible to provide for the server to send a response message to the client system, this response message containing for example a text message indicating that the execution of the function has been carried out correctly.

Of course, the present invention is in no way limited to the embodiments described and represented, but encompasses, on the contrary, any variant form within the capability of the person skilled in the art. In particular, the invention also applies to a client-server environment not included in the context of a communication network. For example, the client and the server may be constituted by distinct software applications implemented within the same computer.

The invention claimed is:

1. A method of requesting, by a client computer system, the execution of a function in a server computer system, the function being applicable to a data object capable of being processed by the server, the method comprising:
the client computer system executing the steps of:
obtaining an interface of the data object from the server;
selecting a function to be applied to the data object from the obtained interface;
determining, by the client computer system, types of different results that are capable of being sent back from the server computer system to the client computer system as a result of the execution of the function by the server computer system, the types of different results being determined from result type identification information, encoded in said interface;
selecting at least one desired result type from said determined different result types;
generating, by the client computer system, a message for invoking the function, the invoking message including the at least one selected desired result type; and
sending the message invoking the function to said server computer system for executing the function and for selecting, among the results obtained during the execution of the function, the execution result desired by the client for the at least one desired result type of the invoking message,
wherein the step of selecting at least one desired result type includes, for each desired result type, determining at least one recipient computer system of the corresponding result, the invoking message including a list of desired results and identification information of said at least one recipient for each desired result type.

2. A method according to claim 1, wherein each of said desired results of said list of desired results contained in said invoking message is represented by an XML tag, itself inserted between a predetermined opening tag and closing tag, each pair of predetermined opening and closing tags defining a sub-list of desired results, destined for a particular recipient.

3. A method according to claim 2, wherein said recipient identification information is defined by a particular attribute of the XML language, inserted in said corresponding opening tag, in said function invoking message.

4. A method of executing by a server computer system a function in a client-server environment, the method comprising:
the server computer system executing the steps of:
receiving a message for invoking the function, coming from a client, said invoking message including at least one desired result type selected by the client from a determined plurality of types of different results, wherein the plurality of types of different results are determined from the result type identification information, and wherein in the client, in selecting at least one desired result type includes, for each desired result type, determining at least one recipient computer system of the corresponding result, the invoking message including a list of desired results and identification information of said at least one recipient for each desired result type;
extracting arguments of the function invoked by said invoking message;
extracting from said invoking message, said at least one desired result type, wherein the step of extracting said at least one desired result type includes the step of extracting, from said invoking message, the list of desired results and identification information of at least one recipient computer system for each type of result desired;
executing the function while applying to it the extracted arguments;
selecting, among the results obtained during the execution of the function, the execution result desired by the client from said at least one desired result type extracted from said invoking message;

generating a function execution response message, said response message containing the selected execution result desired by said client; and sending said function execution response message to said client.

5. A method according to claim 4, wherein the steps of generating and sending said response message to said client include the following steps:

generating a separate response message per recipient identified, each response message containing the corresponding result or results; and sending the response messages to the different recipients.

6. A method according to claim 4, wherein each of said desired results of said list of desired results contained in said invoking message is represented by an XML tag, itself inserted between an opening tag and a closing tag, each pair of opening and closing tags defining a sub-list of desired results, destined for a particular recipient.

7. A method according to claim 6, wherein said recipient identification information is defined by a particular attribute of the XML language, inserted in said corresponding opening tag, in said function invoking message.

8. A method of executing by a server computer system a function, in a client-server environment, said function being able to send back a plurality of different results, and being applicable to a data object, the method comprising:

the server computer system executing the steps of:

receiving a message for invoking the function, coming from a client, said invoking message including at least one desired result type selected by the client from a determined plurality of types of different results, wherein the plurality of types of different results are determined from result type identification information, and wherein in the client, in selecting at least one desired result type includes, for each desired result type, determining at least one recipient computer system of the corresponding result, the invoking message including a list of desired results and identification information of said at least one recipient for each desired result type;

extracting from the invoking message, said at least one desired result type, wherein the step of extracting a type of desired result includes the step of extracting, from said invoking message, the list of desired results and information for identifying at least one recipient computer system for each type of result desired;

obtaining a set of subprograms associated with the function, each subprogram being responsible for the generation of a particular result among the different results which can be sent back following the execution of the function;

selecting the subprogram to generate said at least one desired result type extracted from the invoking message;

executing the subprogram for processing the function and executing the selected subprogram;

generating a function execution response, the response containing the result produced by the execution of the selected subprogram; and sending the function execution response to the client.

9. A method according to claim 8, wherein the steps of generating and sending said response message to said client include the following steps:

generating a different response message per recipient identified, each response message containing the corresponding result or results; and sending said response messages to the different recipients.

10. A method according to claim 8, wherein each of said desired results of said list of desired results contained in said invoking message is represented by an XML tag, itself inserted between an opening tag and a closing tag, each pair of opening and closing tags defining a sub-list of desired results, destined for a particular recipient.

11. A method according to claim 10, wherein said recipient identification information is defined by a particular attribute of the XML language, inserted in said corresponding opening tag, in said function invoking message.

12. A client computer system, for requesting execution of a function in a server computer system, the function being applicable to a data object capable of being processed by the server, comprising:

a processor for executing computer executable code; and a memory storing computer executable code that, when executed by the processor, performs the steps of:

obtaining an interface of the data object from the server;

selecting a function to be applied to the data object from the obtained interface;

determining, by the client computer system, types of different results that can be sent back from the server computer system to the client computer system as a result of the execution of the function by the server computer system, the types of different results being determined from result type identification information, encoded in said interface;

selecting at least one desired result type from said determined different result types;

generating, by the client computer system, a message for invoking the function, the invoking message including the at least one selected desired result type; and sending the message invoking the function to said server computer system for executing the function and selecting, among the results obtained during the execution of the function, the execution result desired by the client for the at least one desired result type of the invoking message, wherein the step of selecting at least one desired result type includes, for each desired result type, determining at least one recipient computer system of the corresponding result, the invoking message including a list of desired results and identification information of said at least one recipient for each desired result type.

13. A server computer system for executing a function in a client-server environment, comprising:

a processor for executing computer executable code; and a memory storing computer executable code that, when executed by the processor, performs the steps of:

receiving a message for invoking the function, coming from a client, said invoking message including at least one desired result type selected by the client from a determined plurality of types of different results, wherein the plurality of types of different results are determined from result type identification information, and wherein in the client, in selecting at least one desired result type includes, for each desired result type, determining at least one recipient computer system of the corresponding result, the invoking message including a list of desired results and identification information of said at least one recipient for each desired result type;

extracting arguments of the function invoked by said invoking message;

extracting from said invoking message, said at least one desired result type, wherein the step of extracting a type of desired result includes the step of extracting, from said invoking message, a list of desired results and information for identifying at least one recipient computer system for each type of result desired;

executing the function while applying to it the extracted arguments;

selecting, among the results obtained during the execution of the function, the execution result desired by the client from said at least one desired result type extracted from said invoking message;

generating a function execution response message, said response message containing the selected execution result desired by said client; and sending said function execution response message to said client, wherein the step of extracting a list of desired results includes the step of extracting, from said invoking message, a list of desired results and identification information of at least one recipient computer system for each type of result desired.

14. A server computer system for executing a function in a client-server environment, said function being able to send back a plurality of different results, and being applicable to a data object, comprising:

a processor for executing computer executable code; and a memory storing computer executable code that, when executed by the processor, performs the steps of:

receiving a message for invoking the function, coming from a client, said invoking message including at least one desired result type selected by the client from a determined plurality of types of different results, wherein the plurality of types of different results are determined from result type identification information, and wherein in the client, in selecting at least one desired result type includes, for each desired result type, determining at least one recipient computer system of the corresponding result, the invoking message including a list of desired results and identification information of said at least one recipient for each desired result type;

extracting from the invoking message, said at least one desired result type, wherein the step of extracting a type of desired result includes the step of extracting, from said invoking message, a list of desired results and information for identifying at least one recipient computer system for each type of result desired;

obtaining a set of subprograms associated with the function, each subprogram being responsible for a generation of a particular result among the different results which can be sent back following the execution of the function;

selecting the subprogram to generate said at least one desired result type extracted from the invoking message;

executing the subprogram for processing the function and executing the selected subprogram;

generating a function execution response, the response containing the result produced by the execution of the selected subprogram; and sending the function execution response to the client.

15. A computer readable storage medium on which is stored computer executable code of a program to implement a method of requesting the execution of a function according to claim 1, when said program is loaded and executed in a client computer system.

16. A computer readable storage medium on which is stored computer executable code of a program to implement a method of executing a function according to claim 4, when said program is loaded and executed in a server computer system.

17. A computer readable storage medium on which is stored computer executable code of a program to implement a method of executing a function according to claim 8, when said program is loaded and executed in a server computer system.

* * * * *